US010060540B2

(12) United States Patent
Cutler et al.

(10) Patent No.: US 10,060,540 B2
(45) Date of Patent: Aug. 28, 2018

(54) DUAL FLOW SWITCHING DEVICE

(71) Applicant: KYLIN SANITARY TECHNOLOGY (XIAMEN) CO., LTD., Xiamen, Fujian Province (CN)

(72) Inventors: Kyle William Cutler, Cedar Knolls, NJ (US); Qingshuang Li, Xiamen (CN); Hui Huang, Xiamen (CN)

(73) Assignee: Kylin Sanitary Technology (Xiamen) Co., Ltd., Xiamen, Fujian Province (CN)

( * ) Notice: Subject to any disclaimer, the term of this patent is extended or adjusted under 35 U.S.C. 154(b) by 0 days.

(21) Appl. No.: 15/537,693

(22) PCT Filed: Mar. 4, 2016

(86) PCT No.: PCT/CN2016/075593
§ 371 (c)(1),
(2) Date: Jun. 19, 2017

(87) PCT Pub. No.: WO2017/024792
PCT Pub. Date: Feb. 16, 2017

(65) Prior Publication Data

US 2017/0335980 A1 Nov. 23, 2017

(30) Foreign Application Priority Data

Aug. 7, 2015 (CN) .................... 2015 2 0589404 U

(51) Int. Cl.
*F16K 11/048* (2006.01)
*F16K 11/044* (2006.01)
(Continued)

(52) U.S. Cl.
CPC .......... *F16K 11/044* (2013.01); *E03C 1/0405* (2013.01); *E03C 1/08* (2013.01);
(Continued)

(58) Field of Classification Search
USPC ...................................................... 137/625.5
See application file for complete search history.

(56) References Cited

U.S. PATENT DOCUMENTS 5,348,231 A * 9/1994 Arnold .................... E03C 1/084 239/428.5
5,666,990 A * 9/1997 Wu ........................... B60S 5/04 137/223
(Continued)

FOREIGN PATENT DOCUMENTS

CN 101251199 A 8/2008
CN 101649917 A 2/2010
(Continued)

*Primary Examiner* — John Fox
(74) *Attorney, Agent, or Firm* — Muncy, Geissler, Olds & Lowe, P.C.

(57) ABSTRACT

Disclosed is a dual flow switching device, comprising a valve body, a valve element, a spring, an inner valve seat and an outer valve seat, wherein the valve element is arranged through the valve body; the middle part of the valve element is provided with an axial liquid channel and a radial liquid channel; the valve element is provided with upper and lower sealing elements; the outlet of the radial liquid channel is located between the upper and lower sealing elements; the outer valve seat is provided in a corresponding position of the upper sealing element and the inner valve seat in a corresponding position of the lower sealing element; the spring is sleeved on the valve element, and a spring seat is provided on the valve element at the upper end of the upper sealing element. The present utility model boasts a dual-outflow channel and dual-flow outflow function.

6 Claims, 5 Drawing Sheets

2 22 3 4 27 45 28 43 5 6 51 11 10 1 13 12

(51) Int. Cl.
*E03C 1/08* (2006.01)
*E03C 1/04* (2006.01)
*E03C 1/02* (2006.01)

(52) U.S. Cl.
CPC ...... *E03C 1/0408* (2013.01); *E03C 2001/026* (2013.01); *F16K 11/048* (2013.01)

(56) References Cited

U.S. PATENT DOCUMENTS 5,707,011 A * 1/1998 Bosio .................... B05B 1/1618
239/447
7,748,406 B2 * 7/2010 Pilatowicz ................ E03C 1/08
137/603
8,376,248 B2 * 2/2013 Meisner ................ E03C 1/0404
239/280

FOREIGN PATENT DOCUMENTS

| | | | |
|---|---|---|---|
| CN | 201615246 | U | 10/2010 |
| CN | 202756667 | U | 2/2013 |
| CN | 104329485 | A | 2/2015 |
| CN | 204852457 | U | 12/2015 |
| GB | 2076116 | B | 10/1983 |

* cited by examiner

DUAL FLOW SWITCHING DEVICE

BACKGROUND OF THE UTILITY MODEL

Technical Field

The utility model relates to the field of a fluid control technology, and more specifically, to a dual flow switching device.

Description of Related Art

In order to save daily water consumption for the purpose of saving water resources, people usually install a flow regulation mechanism in the water channel, through which the water flow rate can be adjusted according to the need in use.

There are many flow regulation valves with a reset function on the market. Usually a button must be pressed during use to maintain a large flow of water, and when the button is released, it is automatically reset to a low-flow state; a flow control valve with no reset function needs to be reset manually after use.

The flow switching structure of a water channel as described in Chinese Patent ZL201220373190.8 published on Feb. 27, 2013 comprises a water channel body, which has a corresponding water inlet and a water outlet as well as a water channel used for connecting the water inlet and outlet, and a switching valve, wherein a valve chamber is provided in the water channel in the vertical water-flow direction, with the left and right side walls of the valve chamber provided with upper and lower water holes, and the switching valve is movably provided in the valve chamber and can be driven to make an elastic movement longitudinally up and down in the valve chamber selectively matched with the upper and lower water holes of the valve chamber. In the technical solution, the water cross-sectional area in the water channel can be changed for the purpose of adjusting the water flow rate at the outlet, but the operation is inconvenient due to a lack of an automatic reset function.

For another example, a flow switching device as described in Chinese Patent ZL201320664909.8 published on Mar. 26, 2014 comprises a valve body, which is provided with a normally open water flow channel and a normally closed water flow channel in the axial direction, and a switching device which is provided in the downstream direction of the vertical water flow, wherein the switching device comprises a valve seat which is provided in the direction of vertical water flow and a switching shaft which is reciprocally slidable in the valve seat and has a large end and a small end, with the small end connected to a button and out of the valve body and the large end connected against an elastic element provided on the valve seat. In the utility model, the switching shaft can be adjusted to control the water flow rate and the elastic element is used for controlling the switching shaft to keep the water outflow from the normally open water flow channel; the switching shaft can be moved by pressing the button, and the normally open water flow channel and the normally closed water flow channel simultaneously output the water which forms a high flow rate, and meanwhile the pressure difference of the water flow at the large and small ends overcomes the elasticity of the elastic element to maintain the switching shaft's state in the second position, without the need for a long-term pressing of the button manually. The technical solution has a function of adjusting the water flow rate and automatically restoring the low water flow rate after the water cut-off, but the switching shaft is perpendicular to the water flow direction and is subjected to the long-term impact of the water flow, so the switching shaft is easy to deform and the service life is not long.

The above-mentioned are technical problems that need to be solved in the utility model.

BRIEF SUMMARY OF THE UTILITY MODEL

To solve the above technical problems, the utility model provides a dual flow switching device which has two different flow rates and different water outflow channels, and meanwhile, is capable of being automatically reset to the water saving mode.

To solve the above technical problems, the utility model provides a dual flow switching device comprising a valve body, a valve element, a spring, an inner valve seat and an outer valve seat, wherein the valve element is arranged through the valve body, the middle part of the valve element is provided with an axial liquid channel and a radial liquid channel: one end of the axial liquid channel is communicated with the outlet of a faucet and the other end is communicated with the radial liquid channel, the valve element is provided with upper and lower sealing elements, the outlet of the radial liquid channel is located between the upper and lower sealing elements, the outer valve seat is provided in a corresponding position of the upper sealing element and the inner valve seat is provided in a corresponding position of the lower sealing element, the spring is sleeved on the valve element, and a spring seat is provided on the valve element at the upper end of the upper sealing element, with one end of the spring provided on the spring seat and the other end against the inner side of the valve body;

the outer valve seat is provided with a mouthpiece, which is matched with the upper sealing element; a first water outflow channel is provided on the outer valve seat, with the water inlet of the first water outflow channel located between the mouthpiece and the upper sealing element, and a second water outflow channel is provided in the middle part of the inner valve seat, with the water inlet of the second water outflow channel located between the lower sealing element and the inner valve seat.

Preferably, the valve body comprises a housing, an upper cover, a lower cover, and a support seat, an annular groove is provided in a position where the outer circumference of the valve element is matched with the upper cover, with a sealing element provided on the annular groove, the outer valve seat is sleeved on the outer side of the support seat and the inner valve seat is provided in the support seat, and the lower cover is fixedly provided under the support seat and connected with the housing.

Preferably, the outer valve seat is of an inner-and-outer bilayer structure: both the inner and outer-layer structures are hollowly cylindrical, the outer and inner-layer structures are arranged in the same coaxial direction and engage with each other, a water outlet is provided in the engaging position, and the mouthpiece is located in the port of the inner surface of the inner-layer structure.

Preferably, a foaming device is provided at the lower end of the support seat.

Preferably, a universal connection device is provided at one end where the valve element extends out of the valve body.

Preferably, the sealing element is a Y-shaped sealing ring.

According to the above-mentioned technical solution, the beneficial effects of the present utility model are as below:

the water flows out of the liquid channel on the valve element, normally in a low-flow mode, and driven by the elastic force of the spring, the valve element closes the lower sealing element with the inner valve seat and separates the upper sealing element from the mouthpiece on the outer valve seat so that the water fills the cavity between the outer valve seat and the valve element and then flows out of the first outflow channel on the outer valve seat; when the valve body is pulled downward relative to the valve element, the elastic force of the spring is manually overcome, so in this case the upper sealing element is closed with the mouthpiece on the outer valve seat and the lower sealing element is separated from the inner valve seat so that the water flows out of the second outflow channel on the inner valve seat, and meanwhile the back pressure applied to the valve body is greater than the elastic force of the spring onto the valve body due to the effect of water pressure, thus making the valve body in a pull-down state, that is, the entire device remains in a high-flow mode; when the water is cut off, the back pressure applied to the valve body gradually disappears, and under the elastic force of the spring, the valve body is restored to the initial position, that is, it is switched to a low-flow mode, so that the present utility model has a function of dual outflow channel and dual-flow outflow, and meanwhile it is able to be automatically reset to a low-flow state for the purpose of saving more water resources.

Figure 1:
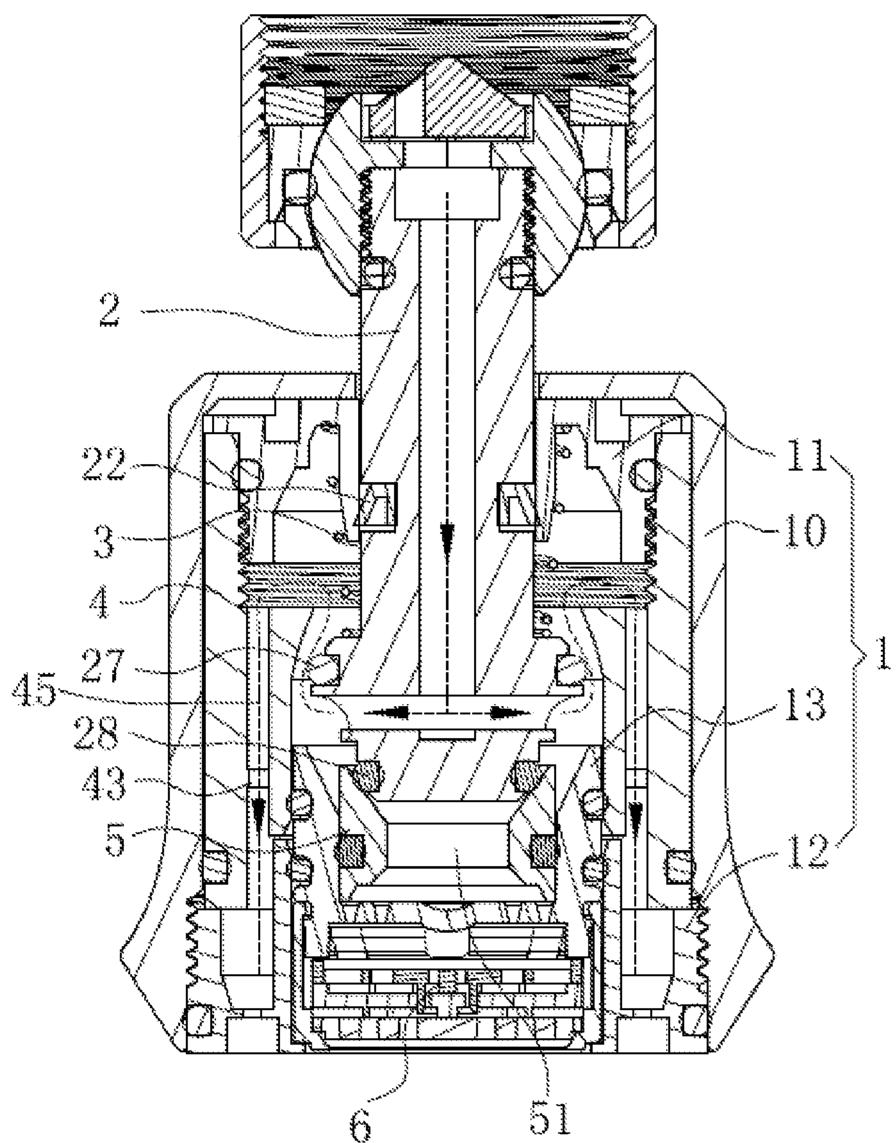
FIG. 1 is a cross-sectional view of an embodiment of the utility model in a low-flow state (the direction of an arrow indicates the direction of water flow)

Description of marks in the drawings: valve body—1, housing—10, upper cover—11, lower cover—12, support base—13, valve element—2, annular groove—21, sealing element—22, axial liquid channel—23, radial liquid channel—24, upper sealing groove—25, lower sealing groove—26, upper sealing element—27, lower sealing element—28, spring seat—29, spring—3, outer valve seat—4, outer-layer structure—41, inner-layer structure—42, water outflow—43, mouthpiece—44, first water outflow channel—45, inner valve seat—5, water outlet—51, second water outflow channel—52, foaming device—6, universal connection device 7.

DETAILED DESCRIPTION OF THE UTILITY MODEL

Figure 2:
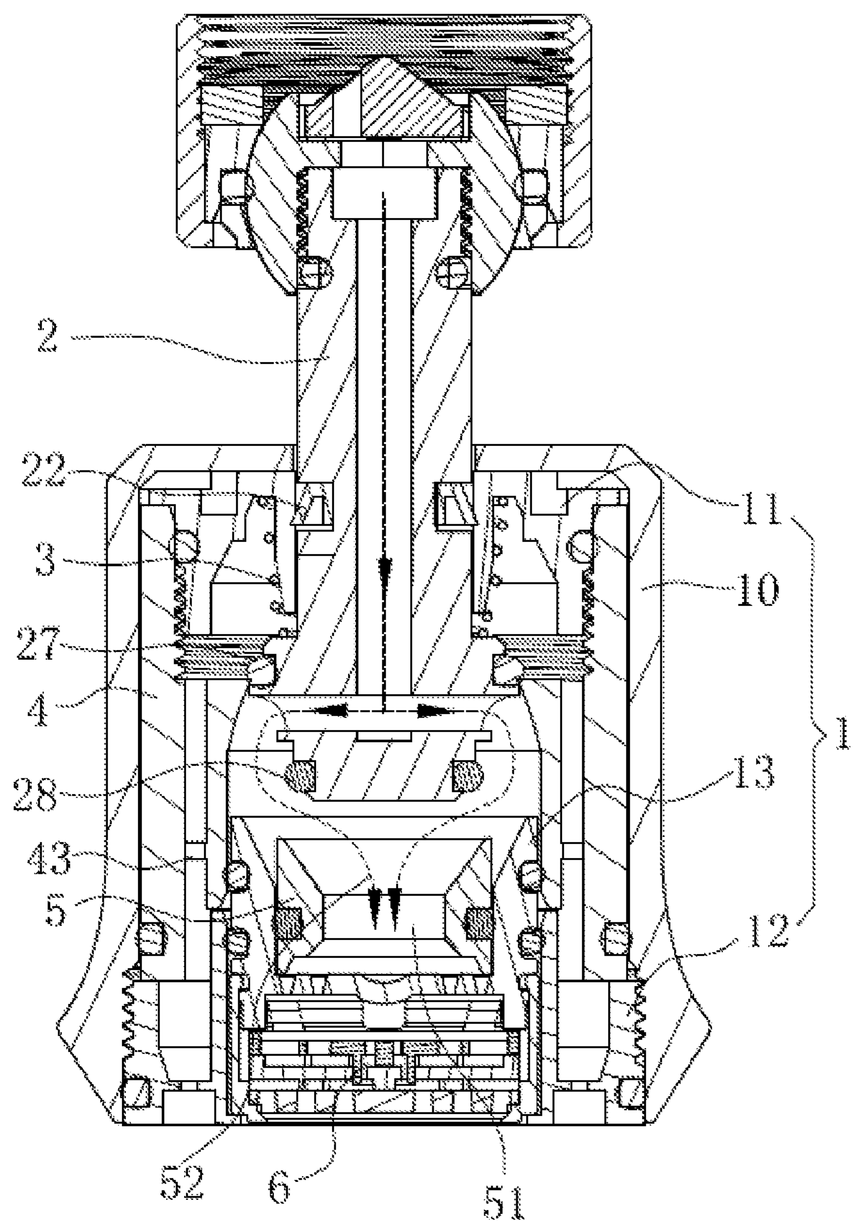
FIG. 2 is a cross-sectional view of an embodiment of the utility model in a high-flow state (the direction of an arrow indicates the direction of water flow)

The present utility model is further detailed in combination with the drawings and embodiments as follows:

as shown in FIG. 1 and FIG. 2, a dual flow switching device comprises a valve body 1, a valve element 2, a spring 3, an outer valve seat 4 and an inner valve seat 5, wherein the valve body 1 comprises a housing 10, an upper cover 11, a lower cover 12, and a support seat 13, an annular groove 21 is provided in a position where the outer circumference of the valve element 2 is matched with the upper cover, with a sealing element 22 provided on the annular groove (the sealing element 22 is preferably a Y-shaped sealing ring), the outer valve seat 4 is sleeved on the outer side of the support seat 13 and the inner valve seat 5 is provided in the support seat 13, with a foaming device 6 provided at the lower end of the support seat 13, and the lower cover 12 is fixedly provided under the support seat 13 and connected with the housing 10, so that the lower cover 12 and the housing 10 makes the inner structure of the device fixed as a whole.

Figure 3:
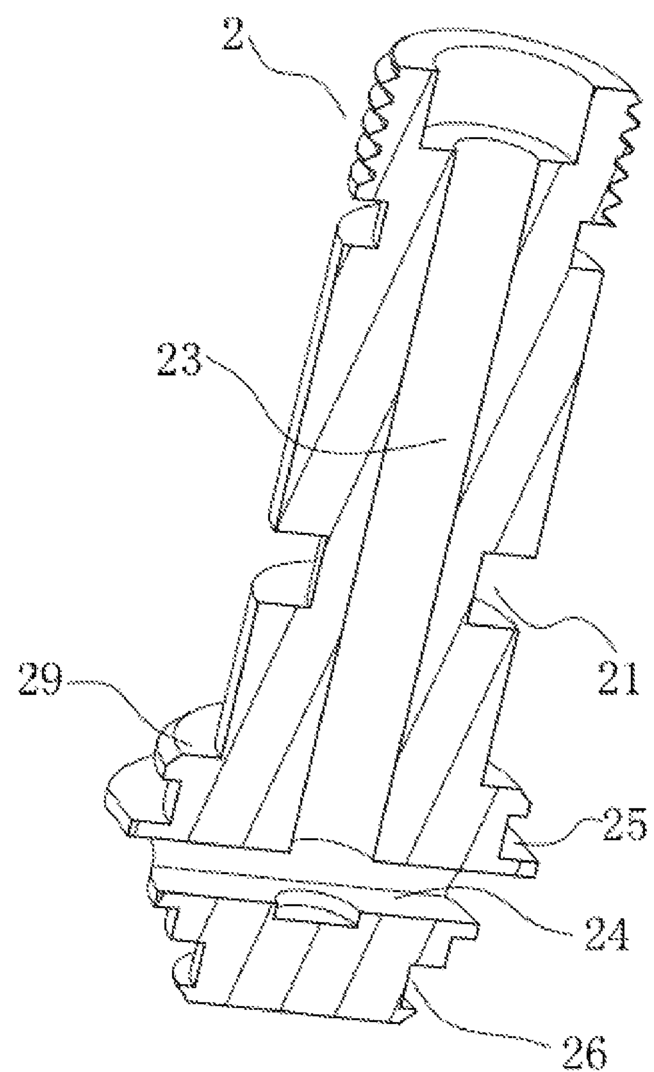
FIG. 3 is a cross-sectional view of the stereoscopic structure of the valve element in an embodiment of the utility model.

With reference to FIG. 3, the middle part of the valve element 2 is provided with an axial liquid channel 23 and a radial liquid channel 24: one end of the axial liquid channel 23 provided in the axial direction of the valve element 2 is communicated with the outlet of a faucet and extends to the radial liquid channel 24 while the other end of the valve element 2 is provided with an upper sealing groove 25 and a lower sealing groove 26 in which an upper sealing element 27 and a lower sealing element 28 are mounted respectively, the outlet of the radial liquid channel 24 is provided between the upper sealing element 25 and the lower sealing element 26, with the upper sealing element 27 matched with the outer valve seat 4 and the lower sealing element 28 matched with the inner valve seat 5, the spring 3 is sleeved on the valve element 2, and a spring seat 29 is provided on the valve element 2 at the upper end of the upper sealing element 27, with one end of the spring 3 provided on the spring seat 29 and the other end against the lower end of the upper cover 11.

Figure 4:
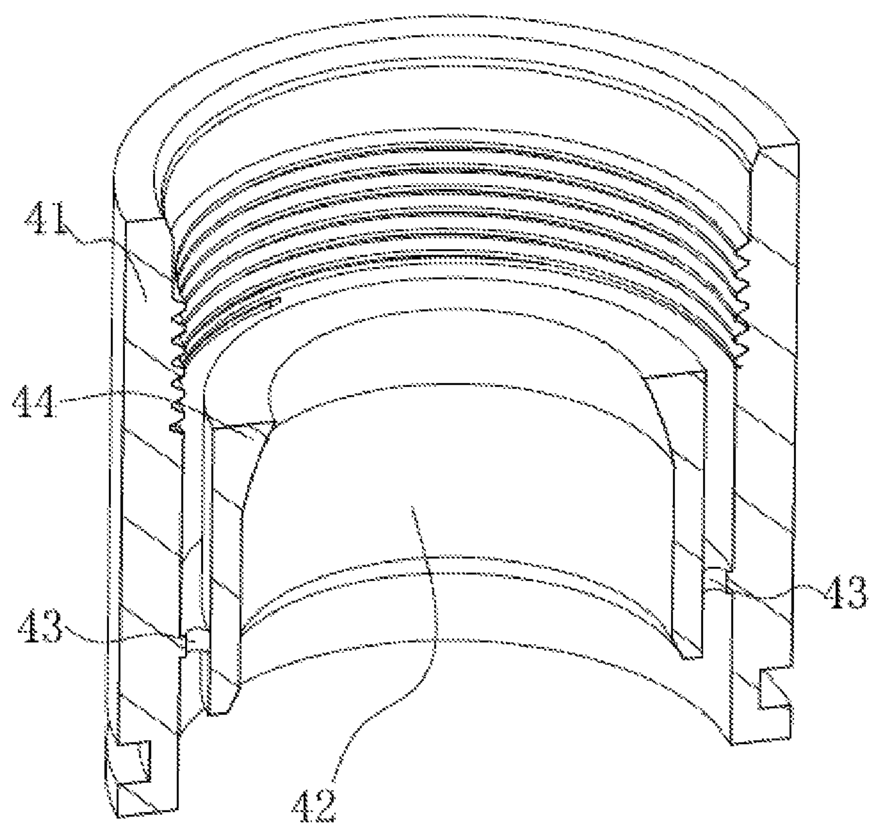
FIG. 4 is a cross-sectional view of the stereoscopic structure of the outer valve seat in an embodiment of the utility model.

As shown in FIG. 4, the outer valve seat 4 is of an inner-and-outer bilayer structure: being of a hollowly cylindrical shape, the inner-layer structure 41 and the outer-layer structure 42 are arranged in the same coaxial direction and engage with each other, a water outlet 43 is provided in the engaging position, and an oblique mouthpiece 44 is added at the inner surface port of the inner-layer structure 42 of the outer valve seat 4, being matched with the upper sealing element 27, so that when the outer valve seat 4 and the upper sealing element 27 are separated, a first water outflow channel 45 is formed between the two; a water outlet 51 is provided on the inner valve seat 5, so that when the lower sealing element 28 and the inner valve seat 5 are separated, a second water outflow channel 52 is formed.

The device is normally in a low-flow mode; driven by the elastic force of the spring 3, the valve element 2 makes the lower sealing element 28 closed with the inner valve seat 5 and the upper sealing element 27 separated from the mouthpiece 44 on the outer valve seat 4 so that the water fills the cavity between the outer valve seat 4 and the valve element 2 and then flows out of the first outflow channel 45 on the outer valve seat 4; when the valve body 1 is pulled downward in a whole relative to the valve element 2, the elastic force of the spring 3 is manually overcome, so in this case the upper sealing element 27 is closed with the mouthpiece 44 on the outer valve seat 4 and the lower sealing element 28 is separated from the inner valve seat 5 so that the second water outflow channel 52 is communicated and the water flows out of the water outlet 51 on the inner valve seat 5; meanwhile the back pressure applied to the valve body 1 is greater than the elastic force of the spring 3 onto the valve body 1 due to the effect of water pressure, thus placing the valve body 1 in a pull-down state, that is, the entire device remains in a high-flow mode; when the water is cut off, the back pressure applied to the valve body 1 gradually disappears, and under the elastic force of the spring 3, the valve body 1 is restored to the initial position, that is, it is switched to a low-flow mode.

Figure 5:
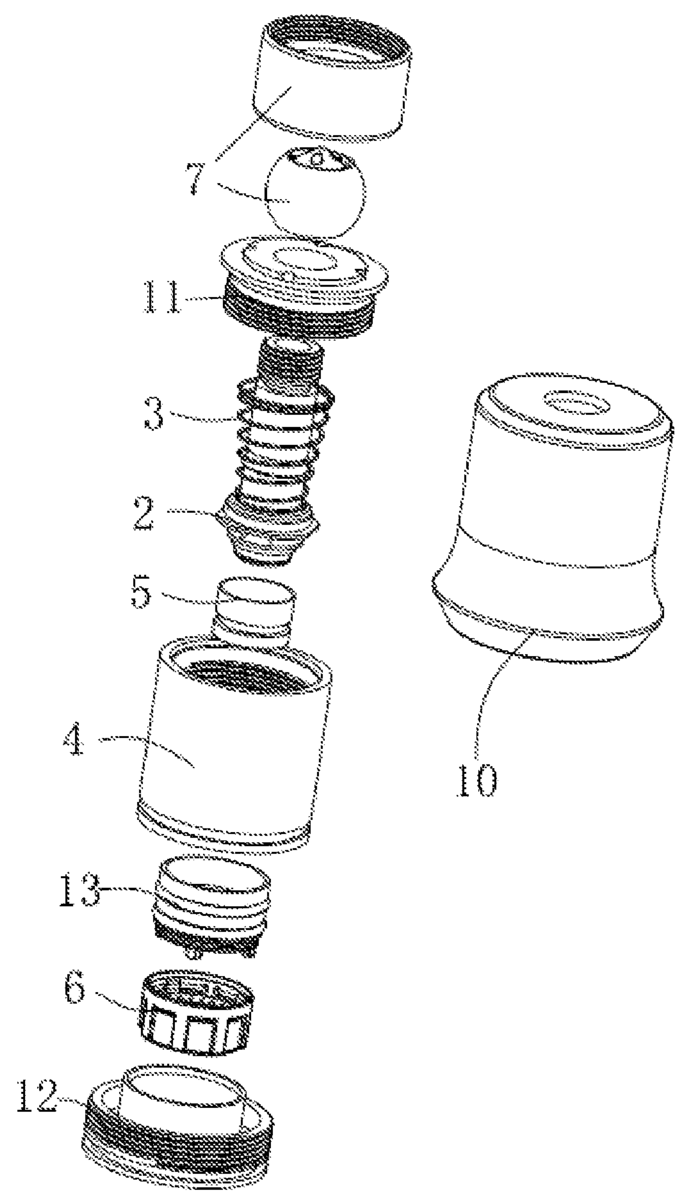
FIG. 5 is an exploded view of the overall structure of an embodiment of the utility model.

As shown in FIG. 5, a universal connection device 7 is provided at one end where the valve element 2 extends out of the valve body 1 and is connected with the outlet of a faucet.

In this embodiment, the specific structures of both the foaming device 6 and the universal connection device 7 belong to a known technique and will not be described herein.

The present utility model is detailed with reference to the specific embodiments above, but they are not intended to limit the utility model. Those skilled in the art can make various modifications and improvements without departing from the principle of the present utility model, and all of them should be included in the protection scope of the utility model.

What is claimed is:

1. A dual flow switching device, comprising a valve body, a valve element, a spring, an inner valve seat and an outer valve seat, wherein the valve element is arranged through the valve body; the middle part of the valve element is provided with an axial liquid channel and a radial liquid channel; one end of the axial liquid channel is communicated with the outlet of a faucet and the other end is communicated with the radial liquid channel; the valve element is provided with upper and lower sealing elements; the outlet of the radial liquid channel is located between the upper and lower sealing elements; the outer valve seat is provided in a corresponding position of the upper sealing element and the inner valve seat is provided in a corresponding position of the lower sealing element; the spring is sleeved on the valve element, and a spring seat is provided on the valve element at an upper end of the upper sealing element, with one end of the spring provided on the spring seat and the other end against an inner side of the valve body;

the outer valve seat is provided with a mouthpiece, which is matched with the upper sealing element; a first water outflow channel is provided on the outer valve seat, with the water inlet of the first water outflow channel located between the mouthpiece and the upper sealing element, and a second water outflow channel is provided in a middle part of the inner valve seat, with the water inlet of the second water outflow channel located between the lower sealing element and the inner valve seat.

2. The dual flow switching device as claimed in claim 1, wherein the valve body comprises a housing, an upper cover, a lower cover, and a support seat, wherein an annular groove is provided in a position where the outer circumference of the valve element is matched with the upper cover, with a sealing element provided on the annular groove; the outer valve seat is sleeved on the outer side of the support seat, the inner valve seat is provided in the support seat, and the lower cover is fixedly provided under the support seat and connected with the housing.

3. The dual flow switching device as claimed in claim 2, wherein the outer valve seat is of an inner-and-outer bilayer structure; both the inner and outer-layer structures are hollowly cylindrical; the outer and inner-layer structures are arranged in the same coaxial direction and engage with each other; a water outlet is provided in the engaging position, and the mouthpiece is located in the port of the inner surface of the inner-layer structure.

4. The dual flow switching device as claimed in claim 3, wherein a foaming device is provided at the lower end of the support seat.

5. The dual flow switching device as claimed in claim 2, wherein the sealing element is a Y-shaped sealing ring.

6. The dual flow switching device as claimed in claim 1, wherein a universal connection device is provided at one end where the valve element extends out of the valve body.

* * * * *